(12) United States Patent
Domae

(10) Patent No.: US 6,590,182 B1
(45) Date of Patent: Jul. 8, 2003

(54) LASER REPAIR APPARATUS AND METHOD

(75) Inventor: Nobushige Domae, Tokyo (JP)

(73) Assignee: Advantest, Corp., Tokyo (JP)

( * ) Notice: Subject to any disclaimer, the term of this patent is extended or adjusted under 35 U.S.C. 154(b) by 0 days.

(21) Appl. No.: 09/175,716

(22) Filed: Oct. 20, 1998

(30) Foreign Application Priority Data

Oct. 20, 1997 (JP) .............................................. 9-287068

(51) Int. Cl.$^7$ ........................ B23K 26/00; B23K 26/16; G01N 21/00
(52) U.S. Cl. ............................. 219/121.69; 219/121.67; 219/121.68; 219/121.6; 356/237.1; 356/237.2
(58) Field of Search ...................... 219/121.68, 121.69, 219/121.82, 121.83, 121.67, 121.73; 355/53, 55; 356/237.1, 239.3, 237.2–237.6, 401

(56) References Cited

U.S. PATENT DOCUMENTS

| | | | |
|---|---|---|---|
| 4,347,001 A | * 8/1982 | Levy et al. ................. 356/390 |
| 4,358,659 A | * 11/1982 | Spohnheimer .............. 141/130 |
| 4,727,234 A | * 2/1988 | Oprysko et al. ......... 219/121.6 |
| 5,059,764 A | * 10/1991 | Baer ....................... 219/121.68 |
| 5,080,482 A | * 1/1992 | Benz et al. ................. 356/127 |
| 5,086,230 A | * 2/1992 | Adachi et al. .............. 250/309 |
| 5,243,377 A | * 9/1993 | Umatate et al. .............. 355/46 |
| 5,340,962 A | * 8/1994 | Schmidt et al. ........ 219/212.78 |
| 5,424,552 A | * 6/1995 | Tsuji et al. .................. 250/548 |
| 5,473,409 A | * 12/1995 | Takeda et al. ................ 355/53 |
| 5,518,956 A | * 5/1996 | Liu et al. ............... 219/121.69 |
| 5,572,501 A | * 11/1996 | Kim ........................... 369/112 |
| 5,594,768 A | * 1/1997 | Fujii et al. .................... 378/21 |
| 5,650,840 A | * 7/1997 | Taniguchi ................... 250/548 |
| 5,757,480 A | * 5/1998 | Shimanaka .............. 356/239.3 |
| 5,837,962 A | * 11/1998 | Overbeck ................. 219/121.6 |
| 5,841,125 A | * 11/1998 | Livingston ................ 250/201.9 |
| 5,847,390 A | * 12/1998 | Long et al. .................. 250/332 |
| 6,052,189 A | * 4/2000 | Fuse et al. ................... 704/219 |
| 6,072,561 A | * 6/2000 | Sakakibara .................. 355/53 |
| 6,084,716 A | * 7/2000 | Sanada et al. ............ 356/237.5 |
| 6,099,522 A | * 8/2000 | Knopp et al. ................. 606/10 |
| 6,103,991 A | * 8/2000 | Domae et al. ......... 219/121.69 |
| 6,160,612 A | * 12/2000 | Itoh et al. ..................... 355/53 |

FOREIGN PATENT DOCUMENTS

| | | | |
|---|---|---|---|
| JP | 6-63779 | | 3/1994 |
| JP | 06-082801 A | * | 3/1994 |
| JP | 7-236989 | | 9/1995 |
| JP | 9-201689 | | 8/1997 |
| JP | 10-76382 | | 3/1998 |
| JP | 10-328872 | | 12/1998 |
| JP | 10-328873 | | 12/1998 |

* cited by examiner

Primary Examiner—Tom Dunn
Assistant Examiner—L. Edmondson
(74) Attorney, Agent, or Firm—Muramatsu & Associates

(57) ABSTRACT

A laser repair apparatus comprises a stage for a wafer to be mounted on, a laser beam source for emitting a laser beam, focus adjusting means for adjusting a focus of the laser beam, and focal point measuring means for measuring a focal point of the laser beam with respect to the wafer on the stage, and a system controller for controlling an overall operation of the laser repair apparatus. The focus adjusting means adjusts a focus with respect to each part to be repair-processed. The system controller sets a focal point at a prescribed position in the required part to be repair-processed as a reference focal point. In performing the repair processing at another position, a focal point is detected by the focal point measuring means. The system controller interrupts the repair processing when the focal point is outside an allowable range from the reference focal point.

4 Claims, 3 Drawing Sheets

LASER REPAIR APPARATUS AND METHOD

BACKGROUND OF THE INVENTION

The present invention relates to a laser processing apparatus and method, more specifically to a laser repair apparatus and method for processing wiring patterns on a semiconductor wafer.

The technique of the repair processing with laser beams is for applying the laser beams with high accuracy to perform required processing for melting fuses to substantially remove defective parts cutting off wiring patterns, etc. on a semiconductor wafer. A typical repair technique is for memory ICs. Redundant cells are provided in a memory IC, and laser beams are applied to melt off fuses to change the address lines of defective cells to that of spare cells for defect remedy, which contributes to higher yields. Other repair processing techniques are trimming processing techniques for correcting resistance values and characteristics of circuit elements, etc.

After the above-described repair processing, results of the repair processing are confirmed visually by the use of, e.g., optical cameras, but it is often difficult to judge based on visual observation, whether or not the repair results are satisfactory. In a case that the repair processing is not proper, and results of the repair processing are not perfect, operations of circuits are often unstable due to transient changes, which is unpreferable in reliability.

Accordingly, it is preferable to apply energy of laser beams of a required beam spot shape to a part to be repaired with accuracy as high as possible to perform repair processing.

Relationships between beam spot diameters and focal depths in the laser beam axial direction are shown in FIGS. briefly described in the following.

As a laser beam has a smallest beam spot diameter at a focus point (hereafter used same meaning as "focal point"), and the beam spot diameter is gradually increased away from the focus point. An irradiation density is expressed by $X/pr^2$ wherein X is a laser bean intensity, and r is a laser beam radius. Thus an irradiation density is proportional to an area of an irradiated part. In order to perform reliable, suitable repair processing, energy of a required irradiation density is applied to a required processed surface to be repair-processed.

When an amount per unit area of energy applied to a target part is small, melting off of a pattern is unsatisfactory. Reversely when an amount per unit area of energy applied to a target part is large, there is a risk that a peripheral part thereof may be damaged. Also known in the art that an allowable focal depth range depends upon an irradiation area at a focus.

A practical focal depth range varies with laser repair apparatuses, and also with processing conditions of wafers and patterns themselves formed on wafers.

In semiconductor wafers on which circuits and patterns are formed on by the recent micronization techniques the patterns have about 0.5–1,0 μm width. It is necessary that laser beams are applied, focused to have spot sizes corresponding to the micronized patterns.

The beam shape with a small-diameter spot must have a focal depth suitable for repair processing. That is, a required irradiation density range with respect to an irradiation density at a focus point must be a focal depth range which is far narrower than the focal depth range.

On the other hand, wafers to be repair-processed have been subjected to various LSI fabrication processes, and have a little warp.

The warps of the processed surfaces of the wafers increase a focal depth range required for forming circuit patterns, and recent micronization of circuit patterns further increases it. The results are that the focal depth range required for forming circuit patterns sometimes exceeds an allowable focal depth range When it exceeds an allowable focal depth range, there are risks that repair processing is unsatisfactory such that adjacent peripheral micronized circuits and patterns may be damaged. Repair processing which causes such risks are quite unpreferable for repair processing requiring especially reliability.

SUMMARY OF THE INVENTION

An object of the present invention is to provide a laser repair apparatus and method which can repair-process with high accuracy wafers-to-be-repaired including those having warp.

The above-described object is achieved by a laser repair apparatus comprising a stage for a wafer to be mounted on, a laser beam source for emitting a laser beam, focus adjusting means for adjusting a focus of the laser beam, and focus point measuring means for measuring a focus point of the laser beam with respect to the wafer on the stage, a focus being adjusted by the focus adjusting means with respect to each required part-to-be-repair processed of the wafer to perform repair-processing by the laser beam on the wafer, a position at which the laser beam is focused by the focus adjusting means at a prescribed position in the required part to be repair-processed being set as a reference focus, in performing the repair processing at another position in the required part to be repair-processed, a focus point being detected by the focus point detecting means, and when the focus point is outside an allowable range from the reference position, the repair processing on the required part to be repair processed being interrupted.

A semiconductor wafer repair apparatus which can reject semiconductor wafers from a repair-processing step when a Z axial height in focus measurement exceeds an allowable value or a prescribed allowable value for a focal depth can be realized.

The above-described object is achieved by a laser repair method for measuring a focus point of a laser beam on a wafer on a stage, adjusting a focus on each required part to be repair-processed, performing repair-processing on the wafer by the laser beam, a position on which the laser beam is focused at a prescribed position in the required part to be repair-processed being set as a reference focus, when the repair-processing is performed at another position in the required part to be repair-processed, a focal point being detected at said another position, and the repair-processing being interrupted when the focus point is outside an allowable range from the reference position.

A semiconductor wafer repair method which can reject semiconductor wafers from a repair-processing step when a Z axial height in focus measurement exceeds an allowable value or a prescribed allowable value for a focal depth can be realized.

The above-described object is achieved by a laser repair method for measuring a focus point of a laser beam on a wafer on a stage, adjusting a focus on each required part to be repair-processed, performing repair-processing on the wafer by the laser beam, a position on which the laser beam is focused at a prescribed position in the required part to be repair-processed being set as a reference focus, when the repair-processing is performed at another position in the required part to be repair-processed, a focal point being detected at said another position, and the repair-processing being interrupted when the focus point is outside an allowable range from the reference position.

Repair-processing time can be saved by time to be spent on a unit of a wafer-to-be-repair processed.

DETAILED DESCRIPTION OF THE INVENTION

The laser repair apparatus according to one embodiment of the present invention will be explained with reference to FIGS. 1 to 3.

Figure 1:
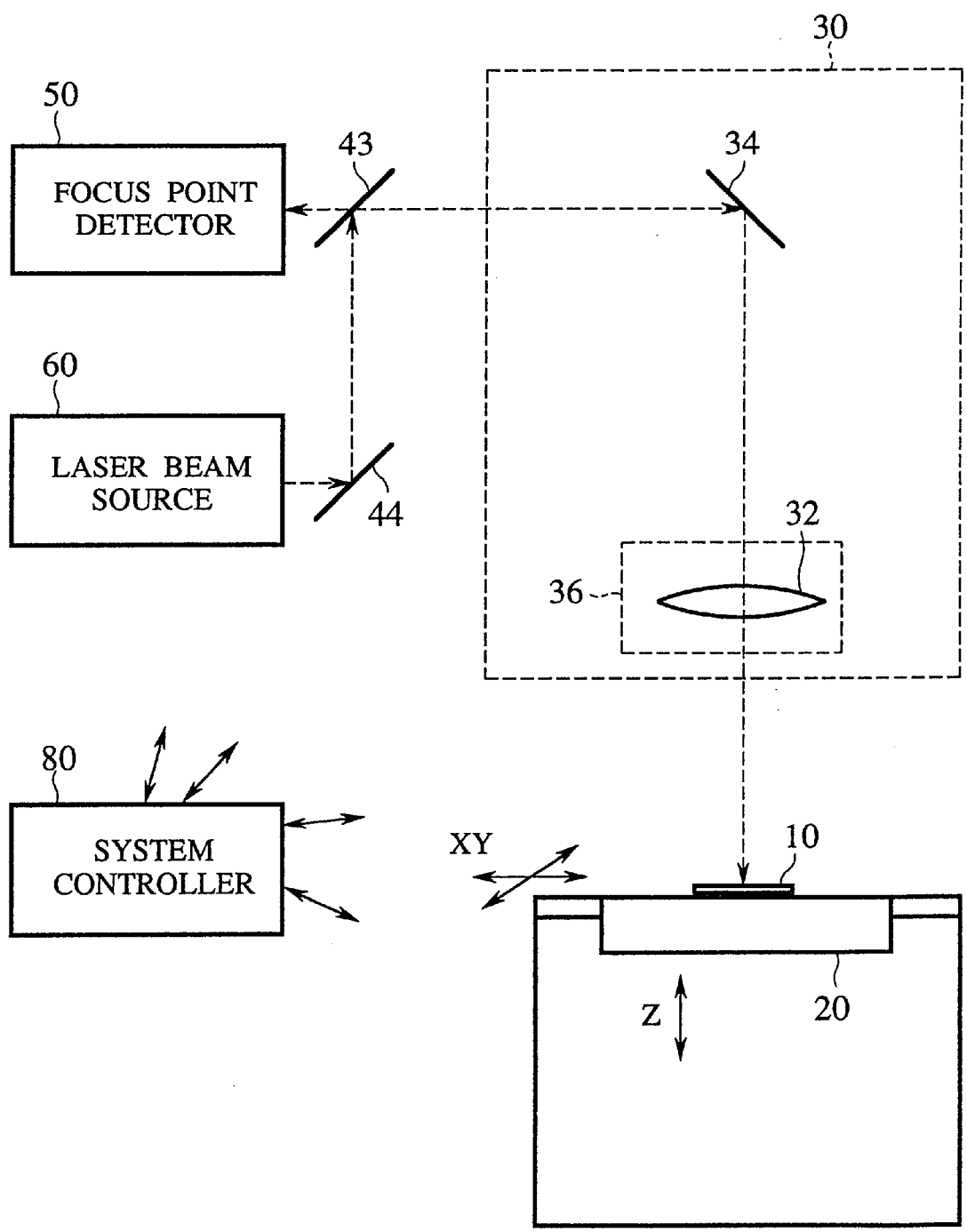
FIG. 1 is a view of a structure of the laser repair apparatus according to one embodiment of the present invention.
Figure 2:
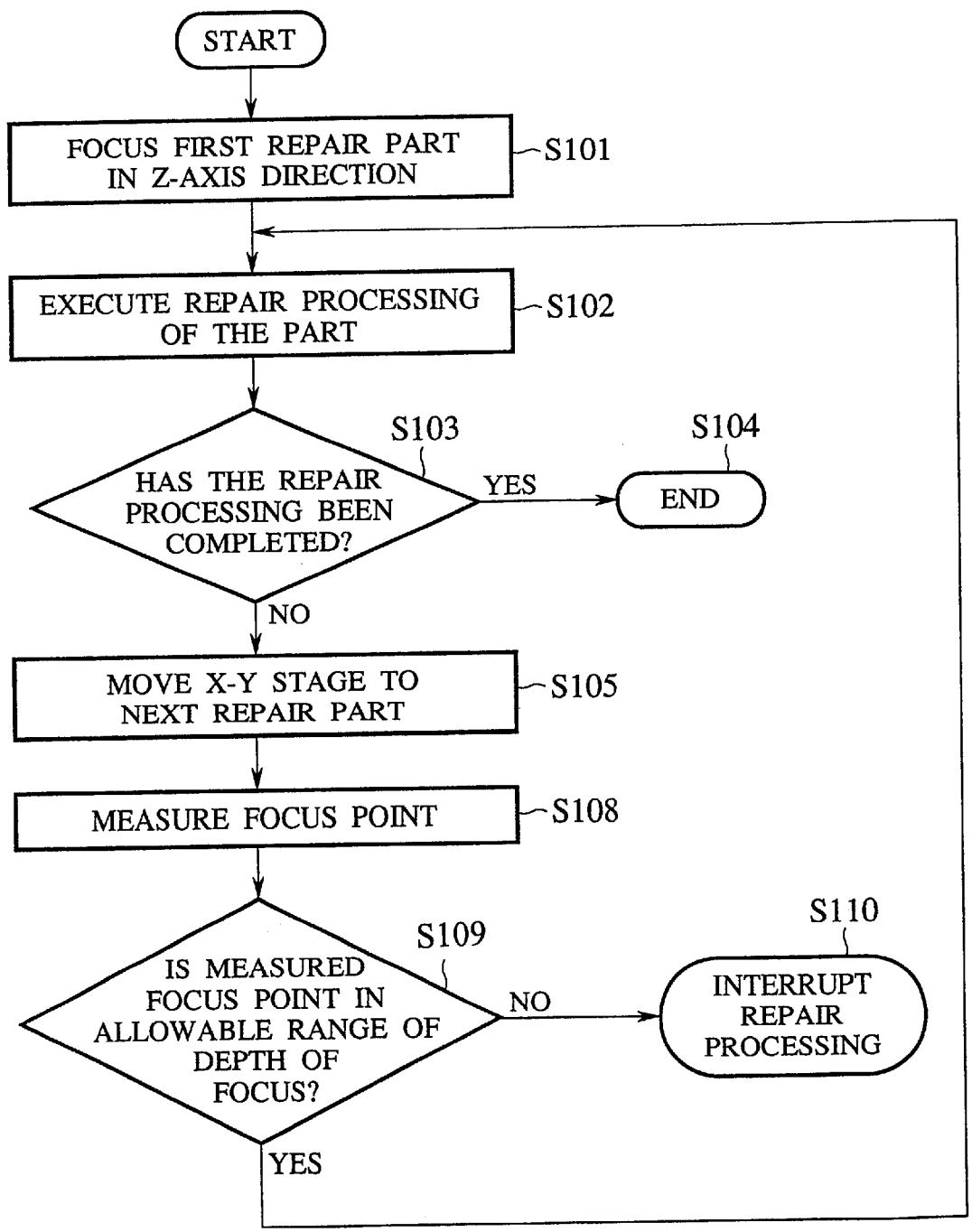
FIG. 2 is a flow chart of the laser repair method according to one embodiment of the present invention.

A structure of the laser repair apparatus according to the present embodiment is shown in FIG. 1.

The laser repair apparatus according to the present embodiment comprises a stage 20, a beam positioner 30, a half mirror 43, a mirror 44, a focus point detector (focal point measuring means) 50, a laser beam source 60 and a system controller (system control unit) 80. The beam positioner 30 includes an objective lens 32, a mirror 34 and a focus adjusting mechanism 36.

A wafer 10 to be repair-processed is mounted on the stage 20. The stage 20 is a mechanism for moving the wafer 10 in three axial directions. Although not shown, the stage 20 includes an XY stage mechanism which is horizontally moved and a Z stage mechanism which is moved in a laser beam axial direction (Z axial direction) and positioning the surface of the wafer for a face angle. A plurality of holes are formed in the upper surface of the stage 20 at a part which is to be brought into contact with the underside of the wafer 10, and the wafer 10 is stuck through the plural holes by a vacuum chuck mechanism.

The beam positioner 30 includes the focus adjusting mechanism 36 which controls the objective lens 32 so that a required spot diameter and a focus point (or "focal point") can be obtained on the wafer 10 at a part to be irradiated.

A laser beam emitted by the laser beam source 60 is reflected on the mirror 44 and the half mirror 43 to be incident on the beam positioner 30. An irradiated energy amount of the laser beam is controlled as required by the system control unit 80. When a laser beam is used in detecting a focus point, the laser beam can be controlled to have small energy.

For the detection of a focus point, a laser beam of small energy is emitted by the laser beam source 60. A focus point is adjusted by controlling the objective lens 32, or subtly controlling the Z stage to move the laser beam back and forth with respect to the irradiated surface of the wafer 10. The focus point detector (focal point measuring means) 50 detects a laser beam which has been reflected on the surface of the wafer 10 and has passed through the half mirror 43, converts the laser beam into an electric signal, and the system control unit 80 processes the signal to determine a focus point.

Then, the laser repair method by the laser repair apparatus according to the present embodiment will be briefly explained. The system control unit 80 controls the overall process of the laser repair method.

The wafer 10 is a thin, disc-shaped silicon wafer. The wafer 10 has been subjected to heat treatments many times and has some warp. According to the control mechanism of the present embodiment, wafers to be repair-processed even including ones having warp can be repair-processed with high reliability.

In repair-processing a wafer, when repair-processing is completed at a part to be repair-processed, the stage 20 is moved for repair processing at a next part. In the present embodiment, every time the stage 30 is moved, a focus point on the surface of the wafer 10 is measured by the focus point detector (focal point measuring means) 50. When a measured value exceeds a required focal depth range, next repair-processing by laser beams is interrupted by the system control unit to reject the wafer 10 from the next repair processing.

The wafer 10 could be rejected from the repair-processing in every repair-processing for a chip in a case that a number of chips are fabricated on the wafer 10, whereby advantageously, unstable repair-processing is precluded, and the repair-processing can be ensured.

A beam spot diameter cannot be directly measured, but in respective laser repair apparatuses a beam spot diameter has a unique interrelationship with a focal depth range, and a required allowable focal depth range can be determined by measuring a focus point.

A relationship between a beam spot diameter and a focal depth range in the laser repair apparatus is measured in advance, a distance from the focus point is stored in a storage medium as an allowable threshold value S in the Z axial direction. When the wafer is repair-processed, a corresponding allowable threshold value S in the Z axial direction is read from the storage medium, based on set conditions of the beam spot diameter, and a required focal depth range can be determined.

Measurement accuracy of the focus point detector 50 sometimes contains measuring errors, and an allowable threshold value S in the Z axial direction which is slightly narrower than an actual focal depth range is used.

As for frequency of measuring focus points by the focus point detector 50, a focus point maybe measured when a beam spot is moved from a previous focus point measuring part by a distance larger than a prescribed displacement distance, whereby measuring frequency may be decreased.

Then, the laser repair method according to the present embodiment will be detailed with reference to the flow chart shown in FIG. 2. In the present embodiment, a focus is measured every time the XY stage 20 is moved.

First in Step 101 focusing at a first part to be repair-processed is performed, and then in Step 102 repair-processing for the part is performed. Then in Step 105 the XY stage 20 is moved to a next part to be repair-processed, and in Step 108 a focus point at the part is measured. In Step 109 it is judged whether or not the focus point is within an allowable focal depth range, i.e., within an allowable threshold value S in the Z axial direction. If the focus point exceeds the allowable threshold value S, Step 110 follows, and next repair processing is interrupted. If the focus point is within the allowable threshold value S, Step 102 follows, and the repair processing is repeated. If the whole part to be repair-processed is within the focal depth range (within the allowable threshold value S in the Z axial direction), Step 103 follows, and the processing is normally finished.

Thus, repair processing which reliably does not exceed a focal depth range can be performed, whereby advantageously unstable repair processing can be precluded without failure, and reliability of the repair processing can be ensured.

Generally wafers to be repair-processed, which have been subjected to various LSI fabrication processes, have some warp. Accordingly in the focusing for repair processing, as shown in FIG. 3A, a height in the direction of height (the Z axial direction) of a semiconductor wafer 10 at a position thereon is measured by the focus point detector 50, and a focus of a laser beam is controlled to be set in accordance with the measured height.

Figure 3A:
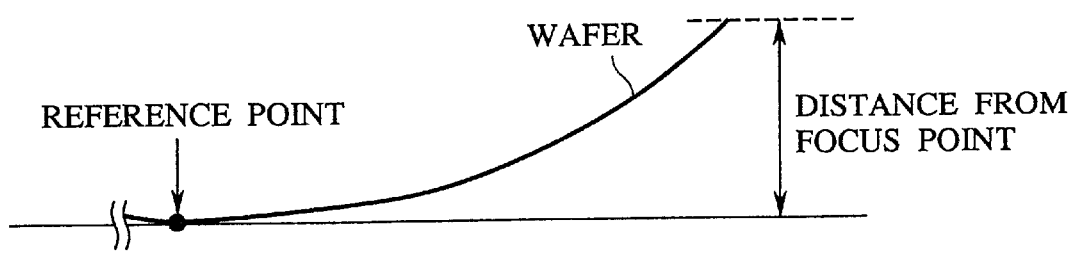
FIGS. 3A and 3B are views of relationships between focus correction and wafer warp.

As shown in FIG. 3A, a focus point is set with a Z axial height at one point on the wafer 10 set as a reference point. In FIG. 3A, however, a warp itself is a difference of a focus point from the reference point. In such case, even a little warp tends not to allow a focus point to be within a prescribed focal depth range.

Figure 3B:
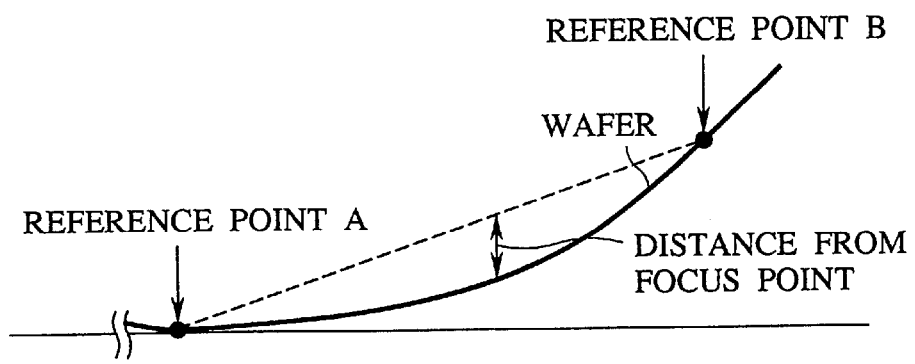

Then, as shown in FIG. 3B, a height in the Z axial direction is determined with a line interconnecting reference points A, B at two positions on the wafer 10 set as a reference point. With the height set as a reference point, focus points on respective positions on the wafer 10 are determined. In accordance with the focus points the beam positioner 30 is controlled, and a focus of a laser beam is gang-controlled. By the laser repair method according to the present embodiment, even in a case that a wafer has a little warp, a difference between a focus point and the reference points is made small by the interpolation computation between the reference points, whereby a part to be repair-processed can be within a prescribed focal depth range.

The present invention is not limited to the above-described embodiment and can cover other various modifications.

In the laser repair method according to the above-described embodiment, every time the stage 20 is moved, the focus measurement is performed, but it is possible that the focus measurement is performed only when the stage 20 is moved from a previous focus measuring position by a prescribed distance, whereby the focus measurement is performed decreased times.

In the laser repair method according to the above-described embodiment, every time the stage 20 is moved, the focus measurement is performed. However, all of the focus measurements are in advance performed in a part to be repair-processed at every respective unit sectional distance. In this case, it is possible that whether or not at least one of measured values given at the respective unit sectional distances exceeds a prescribed focal depth range (an allowable threshold value S in the Z axial direction)is judged, and, if it does exceed, the repair processing is not performed at all. This case has an advantage that repair processing time can be saved by time to be spent on a unit of a wafer-to-be-repair processed.

The above-described laser repair method uses the laser repair apparatus of the structure shown in FIG. 1, but is applicable to laser repair apparatus of other structures.

What is claimed is:

1. A laser repair method for a semiconductor wafer, comprising the following steps of:

measuring a focal point of a laser beam on the wafer on a stage, adjusting a focus on each required part to be repair-processed, setting a focal point on which the laser beam is focused at a prescribed position in the required part to be repair-processed as a reference focal point, detecting a focal point at another position when the repair-processing is performed at said another position in the required part to be repair-processed, and performing repair-processing on the wafer by the laser beam by cutting and/or trimming a circuit pattern on a position in the required part of the wafer without adjusting the focal point, where a width of said circuit pattern is less than 1.0 $\mu$m, and interrupting the repair-processing on the required part when the focal point is outside an allowable range from the reference focal point without adjusting the focal point.

2. A laser repair method for a semiconductor wafer, comprising the following steps of:

measuring a focal point of a laser beam on the wafer on a stage, adjusting a focus on each required part to be repair-processed, measuring a plurality of focal points with respect to a plurality of positions in the required part to be repair-processed in advance, setting one of the plural focal points with respect to the plural positions as a reference focal point, performing repair-processing on the wafer by the laser beam by cutting and/or trimming a circuit pattern on a position in the required part of the wafer without adjusting the focal point, where a width of said circuit pattern is less than 1.0 $\mu$m, and interrupting the repair-processing on the required part from being performed when a focal point with respect to one of the plural positions in the required part is outside an allowable range from the reference focal point without adjusting the focal point.

3. A laser repair method according to claim 1, wherein said required part is a whole area of the wafer, a plurality of chip areas in the wafer, a whole area of one of the chips in the wafer, or a partial area in said one of the chips.

4. A laser repair method according to claim 2, wherein said required part is a whole area of the wafer, a plurality of chip areas in the wafer, a whole area of one of the chips in the wafer, or a partial area in said one of the chips.

* * * * *